United States Patent Office 3,435,784
Patented Apr. 1, 1969

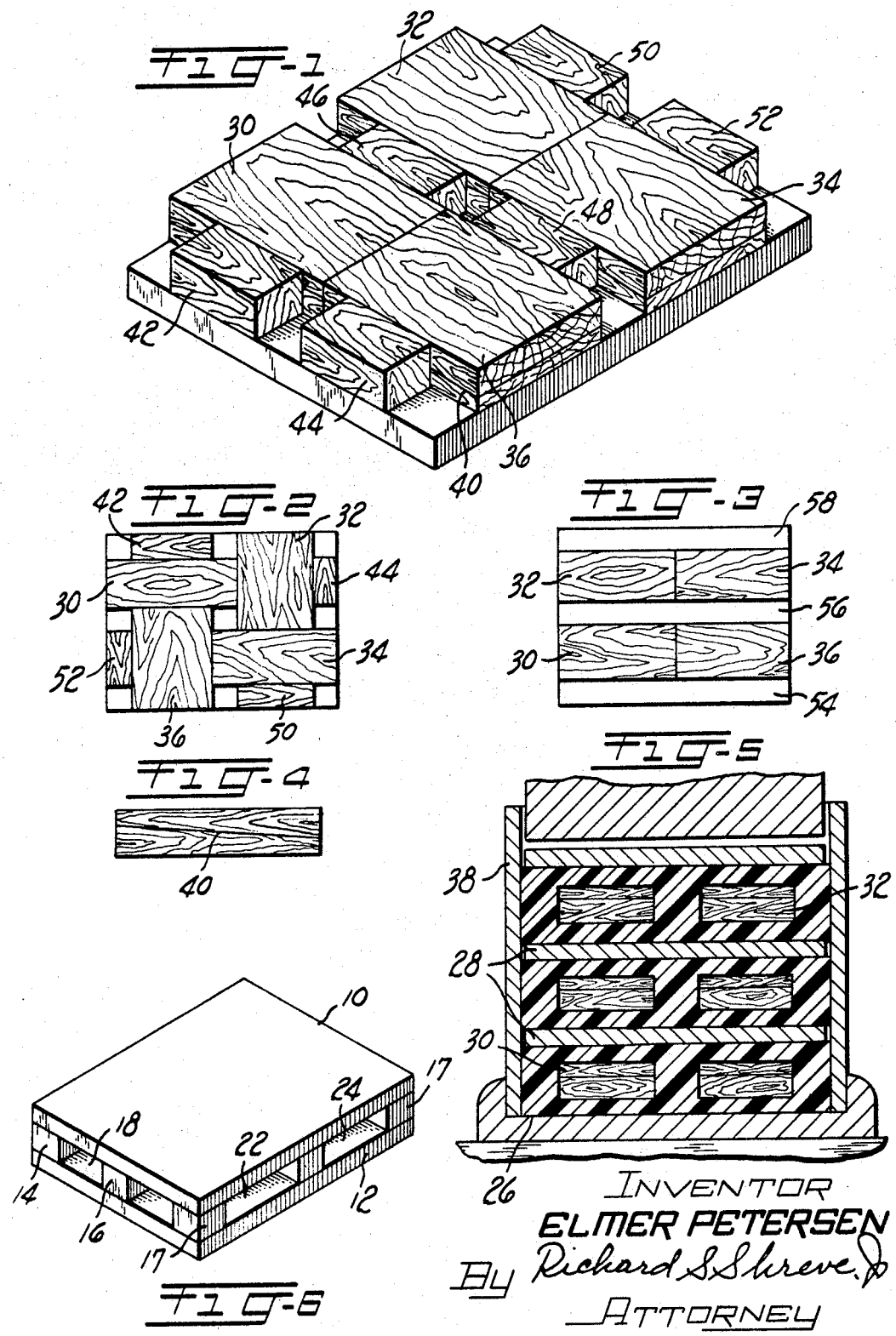

3,435,784
PALLET MOLDING
Elmer Petersen, 122B Edenburg Lane, Leisure Village, Lakewood, N.J. 08701
Filed Feb. 14, 1967, Ser. No. 621,387
Int. Cl. B65d 19/24
U.S. Cl. 108—51          2 Claims

ABSTRACT OF THE DISCLOSURE

Pallet molded of comminuted wood and binder by rectangular cores placed on a lower layer but spaced apart to receive spread compound and form spacers therebetween and a top layer thereabove and integral therewith, preferably in stacked relation with the top of one mold forming the bottom of the mold thereabove, and the stack subjected to heat and pressure.

Background

This invention relates to pallet molding, and more particularly to a pallet of integral composition and a method of manufacturing the same.

Pallets are formed in the trade of shipping and transportation of material from place to place, and used in stacking to a greater height in order to save floor space. When the pallets are used to stack articles or packages in storage, they serve to separate the same and permit entrance therebetween of the tines of a fork lift truck. The most popular size is 40 by 48 inches, or nearly 13 square feet.

Summary

While pallets have been made of waste wood, the same is generally in the form of slats held together by metal fasteners or glue or cement, with attendant cost of material of construction and labor of assembly.

The main object of the present invention is to reduce the cost of the pallet.

Other objects are to form the pallet by molding a composition of waste wood, to facilitate the forming of sockets for lightening the weight and for receiving the tines of a fork lift truck, and the forming of integral spacers between top and bottom panels.

In the drawings:

FIGURE 1 is an isometric projection of the bottom layer and the arrangement of cores thereon for the molding of the pallet according to one form of the present invention;

FIGURE 2 is a plan view of an alternate modification;

FIGURE 3 is a plan view of the preferred embodiment;

FIGURE 4 is a side elevation of one of the double layer cores, showing the incline or taper for removal thereof;

FIGURE 5 is a vertical section of a stack of molds in the process of curing; and FIGURE 6 is an isometric projection of the finished pallet according to the embodiment of FIGURE 1.

The pallet as shown in FIGURE 6 comprises a substantially flat rectangular top panel 10 and a similar bottom panel 12, with a plurality of struts therebetween of smaller cross section than the panels 10 and 12. These struts include corner struts 14, and middle struts 16 at the midportions of the sides of the pallet. The panels 10 and 12 and struts 14 and 16 are all integral, of a compound of comminuted wood, such as chips, shavings, or sawdust, and a binder therefor, such as a resin or other adhesive such as wood flour.

Between the panels 10 and 12 the pallet has four rectangular sockets 18 and 20 with their outer ends extending to opposite sides of their panel and their inner ends directed toward the center thereof. These sockets each have a corner strut 14 at one side and a middle strut 16 at the other side thereof. From this it follows that the sockets are of a width substantially equal to a fraction, preferably a half, of a side of their panel minus at least the thickness of a strut, preferably once and a half times such thickness. These sockets are of a width slightly greater than the tines of a fork lift truck, and of a depth slightly greater than the thickness of such tines.

The sockets 18 and 20 meet in the center, and the remaining sides have smaller sockets 22 and 24 intersecting the side of the larger sockets, to receive said fork lift tines from any of the four sides of the pallet.

The pallets are manufactured as shown in FIGURE 1. First a layer of comminuted wood and binder is spread over the substantially flat surface of a molding element, such as the mold base 26 or a flat mold separator 28, both shown in FIGURE 5. This layer is of the desired thickness to form the bottom panel 12.

After the bottom layer is formed, four substantially rectangular oblong cores 30, 32, 34, and 36 are placed on top of the layer 12 with their outer ends extending to opposite side walls 38 of the molding element and their inner ends directed toward the center thereof where they meet in abutting relation. The width and thickness of these cores is the same as that described for the sockets 18, 20, 22, and 24 formed thereby.

As shown in FIGURE 4, each core is preferably formed of a pair of superimposed substantially flat plates or slabs preferably of metal and of the same width and length, thus forming four flat surfaces, at least one of which is inclined as at 40 to form a taper to facilitate removal thereof. The other of the pair may be inclined in the opposite direction, since removal of the first makes free room for removal of the second. The side edges of both have a slight taper to converge toward the center.

In placing these cores, the same are spaced apart a distance substantially equal to the thickness of the struts and the cores are spaced from the adjacent sides of the bottom layer for a distance substantially equal to the thickness of the struts.

After these larger cores are positioned, smaller oblong cores 42, 44, 46, 48, 50, and 52 of a width substantially the thickness of the struts 14 and 16 are placed so as to extend between pairs thereof. These smaller cores are of a length equal to the width of the larger cores 30, 32, 34, and 36, and are placed with the smaller cores each having a side abutting a side of one of said larger cores.

After both the larger and the smaller cores are in position, more of the molding compound is spread over the bottom layer and the cores to form the struts between the cores and contacting the bottom layer, and to form an upper layer contacting the tops of the spacers to form the top pallet panel 10.

A flat molding element 28 is applied over this upper layer to close the mold, which is subjected to heat and pressure, preferably in the stacked relation shown in FIGURE 5, with the top element 28 of one mold forming the bottom of the mold thereabove.

After the pallets are cured, the cores are removed therefrom by outward movement of the larger cores 30, 32, 34, and 36, longitudinally of the cores and from between the panels and from between the struts. The smaller cores 42, 44, 50, and 52 are removed laterally through the adjacent side. The center cores 46 and 48 can then be pushed out laterally.

In the modification shown in FIGURE 2, the larger cores 30, 32, 34, and 36 are arranged in a swastica-like form, the side of each successive core abutting the inner end of an adjacent core. Then smaller cores 42, 44, 46, and 48 are applied to the outer side of each larger core.

The smaller cores 46 and 48 of FIGURE 1 are not necessary in this form, because their function is supplied by the inner ends of all four larger cores to form the central spacer 17. Thus only four smaller cores are needed. This form of FIGURE 2, like the form shown in FIGURE 1, can receive the tines of the fork truck from any of the four sides.

In the form shown in FIGURE 3, the four cores 30, 32, 34, and 36 are applied, but no smaller cores. This leaves continuous side walls 54 and 58, and a continuous center wall 56, as struts between the panels 10 and 12. This form can receive the tines of a fork truck from only two opposite sides. This form is preferred for inexpensive manufacture and for strength of construction.

What is claimed is:

1. Pallet comprising substantially flat rectangular top and bottom panels of uniform thickness with a plurality of struts therebetween at the corners and at least midportions of the sides thereof and a rectangular one in the center, all smaller in cross section than said panels,
    (a) all integral of a compound of comminuted wood sawdust and a binder therefor,
    (b) said pallet having between said panels at least four substantially rectangular sockets with their outer ends extending to opposite sides of said panels and their inner ends directed toward the center thereof,
    (c) said sockets being of a width substantially equal to a fraction of a side of said panels minus at least the thickness of said struts.

2. Pallet as claimed in claim 1, in which said struts form continuous side walls and a continuous center wall therebetween, and said sockets are of a width slightly greater than the tines of a fork truck.

References Cited

UNITED STATES PATENTS

| | | | |
|---|---|---|---|
| 2,493,562 | 1/1950 | Yarman | 108—58 |
| 2,841,350 | 7/1958 | Chronister | 108—56 |
| 3,104,085 | 9/1963 | Skladany | 108—51 XR |
| 3,251,322 | 5/1966 | Downds | 108—58 |
| 3,275,131 | 9/1966 | Erickson. | |
| 3,307,504 | 3/1967 | Cloyd et al. | 108—58 |
| 3,187,689 | 6/1965 | Hess | 108—58 |
| 3,269,336 | 8/1966 | Naylor et al. | 108—58 |
| 3,124,627 | 3/1964 | Hood | 264—45 |
| 3,152,199 | 10/1964 | Roberts | 264—45 |
| 3,177,271 | 4/1965 | Slayman | 264—45 |

FOREIGN PATENTS 129,084  8/1950  Sweden.

BOBBY R. GAY, *Primary Examiner.*

G. O. FINCH, *Assistant Examiner.*

U.S. Cl. X.R.

108—58